UNITED STATES PATENT OFFICE.

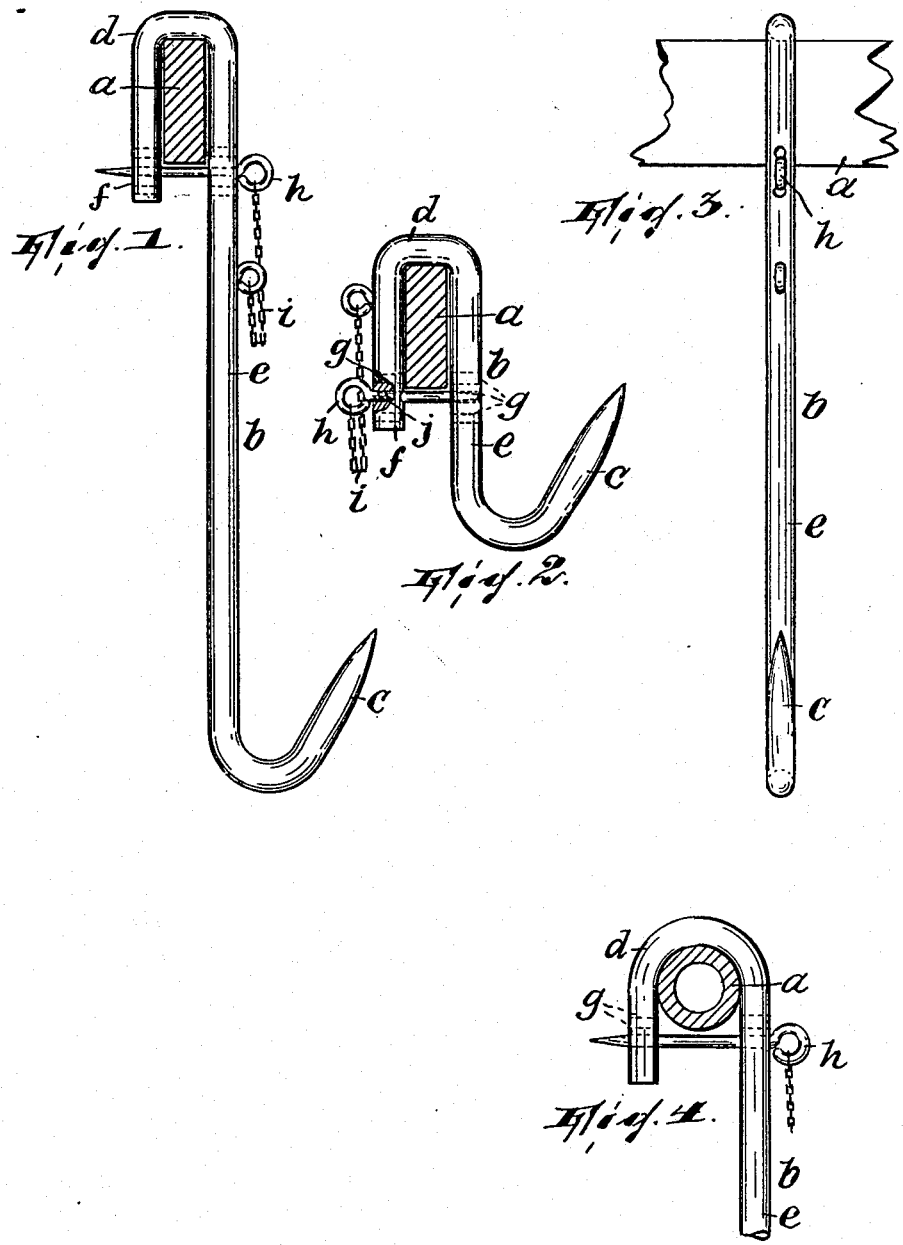

GEORGE E. THOMPSON, ISIDOR C. BENEDICT, AND REUBEN BENEDICT, OF PATERSON, NEW JERSEY.

MEAT-HOOK.

No. 829,239.        Specification of Letters Patent.        Patented Aug. 21, 1906.

Application filed October 25, 1905. Serial No. 284,346.

*To all whom it may concern:*

Be it known that we, GEORGE E. THOMPSON, ISIDOR C. BENEDICT, and REUBEN BENEDICT, citizens of the United States, residing in Paterson, county of Passaic, and State of New Jersey, have invented certain new and useful Improvements in Meat-Hooks; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

In the handling of beef, particularly in removing it from cars and refrigerators in vessels where it is hung on hooks suspended from rails, two men at least are required. The hooks are formed rebent at the upper portion, so as to removably hook on the rails, and while one man removes the meat from the hook the other holds the hook down on the rail. Even thus a hook, through carelessness, often falls and injures one of the men.

Our invention has for its object to provide a hook which will have means whereby upward displacement, and possibly complete disengagement, thereof from the rail will be absolutely prevented, except where it is intended to remove it from the rail, and thus only one man, instead of two, be needed to remove the meat from the hooks.

Our invention will be found fully illustrated in the accompanying drawings, wherein—

Figure 1 is a side view of one form of our improved hook. Fig. 2 is a similar view illustrating a slight modification. Fig. 3 is a front view of the hook shown in Fig. 1, and Fig. 4 illustrates another modified form of the invention.

In the drawings, $a$ designates the rail, which may be either a flat or round rail, as illustrated in the drawings.

$b$ is the hook, having the usual sharpened hook portion $c$ at its lower end and rebend $d$ at its upper end. The rebend $d$ is rectangular or round, as in Figs. 1, 2, 3, and 4, respectively, according to the conformation sectionally of the rail.

In the shank $e$ of the hook and the extremity $f$ of its rebend are provided one or more sets of alined holes $g$, which are adapted to receive a pin $h$, permanently attached to the shank by means of a chain $i$. This pin when inserted in the holes $g$ of the shank and extremity of the rebent portion passes under the rail $a$, and thus effectually prevents the hook from upward movement when the meat is lifted off the hook. Several sets of holes $g$ are provided so that various sizes of rails may be accommodated. In order to prevent the pin from slipping out, it may either be made to fit rather snugly in the holes or provided with threads $j$, adapted to enter corresponding threads in one of the holes $g$, as in Fig. 2.

In the long type of hook shown in Fig. 1, which is adapted for receiving fore quarters of beef, the pin will be more conveniently inserted from the front of the hook. In the short type of hook, which is adapted to receive hind quarters, the pin is preferably inserted from the rear of the hook.

Having thus fully described our invention, what we claim, and desire to secure by Letters Patent of the United States, is—

The combination, with the rail, of the hook having its upper end rebent and hooked over the rail, the hook-shank and the rebent portion having alined holes, and a pin attached to the hook and removably arranged in said holes, whereby to prevent upward displacement of the hook off the rail, substantially as described.

In testimony that we claim the foregoing we have hereunto set our hands this 23d day of October, 1905.

GEO. E. THOMPSON.
       ISIDOR C. BENEDICT.
       REUBEN BENEDICT.

Witnesses:
     JOHN W. STEWARD,
     ADELE GLATT.